Feb. 27, 1962 F. E. GRENIER 3,022,644
AUTOMOBILE AIR CONDITIONER CONDENSER
Filed Dec. 14, 1959 2 Sheets-Sheet 2

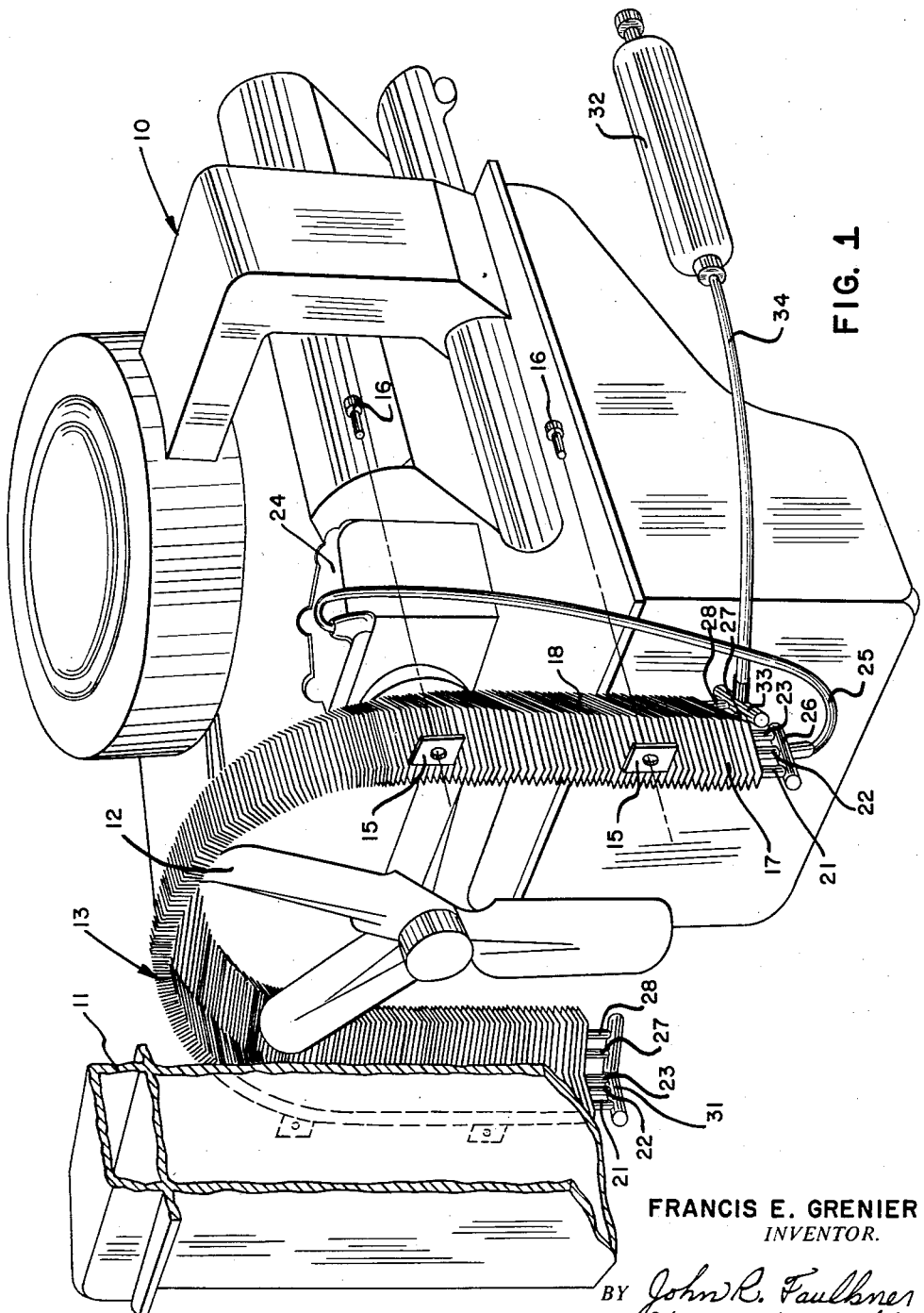

FRANCIS E. GRENIER
*INVENTOR.*

BY *John B. Faulkner*
*Keith L. Zerschling*
ATTORNEYS

_United States Patent Office_

3,022,644
Patented Feb. 27, 1962

3,022,644
AUTOMOBILE AIR CONDITIONER CONDENSER
Francis E. Grenier, Livonia, Mich., assignor to Ford Motor Company, Dearborn, Mich., a corporation of Delaware
Filed Dec. 14, 1959, Ser. No. 859,176
4 Claims. (Cl. 62—243)

This invention relates to an automobile air conditioning system and more particularly to such a system in which a condenser is mounted in spaced relationship about the periphery of a fan employed for engine cooling purposes.

In the conventional automotive vehicle air conditioning system, the condenser is normally mounted in front of the radiator and is usually rectangular in configuration. During engine idling conditions, the engine radiator fan must be relied upon to pull air past the condenser. The fan rotates rather slowly, however, during engine idling conditions and as a consequence relatively little air is moved through the condenser in a region adjacent the center of the fan and in a region radially outwardly from the tips of the fan blades. Thus, the effective portion of the condenser is somewhat torus shaped and may comprise as little as 30% of the total. As a result, the conventional air conditioning system described is quite ineffective when the vehicle engine is idling.

The present invention is directed toward improving the effectiveness of an air conditioning system for an automotive vehicle at engine idle as well as during other ranges of engine operation. This is accomplished by mounting the air conditioning system condenser in spaced relationship about the periphery of an engine driven radiator fan. The air flow from the fan is directed radially outwardly over the condenser and thus even at idle nearly 100% of the condenser is utilized for heat exchange purposes. In addition, mounting the condenser behind the radiator in spaced relationship about the periphery of the fan provides unobstructed air flow through the radiator, thereby improving the efficiency of the engine cooling system.

An object of the present invention is the provision of a more efficient air conditioning system for an automotive vehicle.

Another object of the invention is the provision of an air conditioning system for an automotive vehicle which is very effective when the vehicle engine is idling.

A further object of the invention is the provision of an air conditioning system for an automotive vehicle in which the engine cooling efficiency is improved over vehicles employing conventional air conditioning systems.

Other objects and attendant advantages of the present invention will become more apparent when the specification is considered in relation to the accompanying drawings in which:

FIG. 1 is a perspective view, with portions cut away, showing an automotive vehicle engine in combination with vehicle air conditioning system components;

Figure 2:
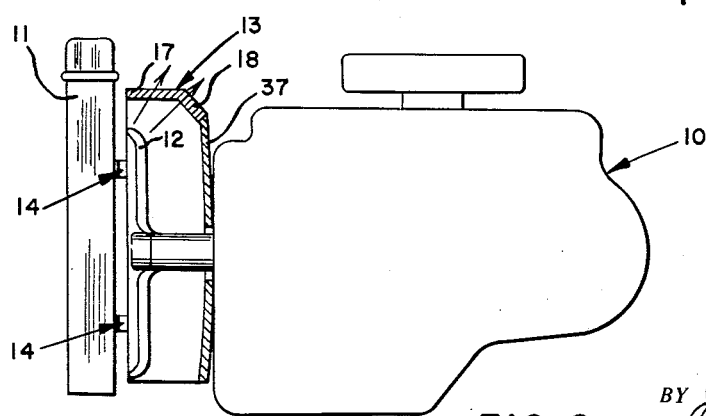
FIG. 2 is an elevational phantom view, partially in section, of the vehicle engine in combination with vehicle air conditioning system components as shown in FIG. 1 and showing in addition an engine fan shroud.

Referring now to the drawings, in which like reference numerals designate like parts throughout the several views thereof, there is shown in FIGS. 1 and 2 an internal combustion engine generally designated by the numeral 10. An engine coolant radiator 11 is mounted in front of the engine while an engine driven fan 12 is employed to draw air through the radiator.

A condenser 13 for a vehicle air conditioning system is positioned in spaced relationship about the periphery of the fan 12. The condenser may be supported from the radiator by a plurality of fastening devices generally indicated at 14. These fastening devices may include brackets 15 and bolts 16. As shown in FIG. 2, the front surface of the condenser is positioned in approximately the same plane as the front surface of the fan.

The condenser, which may be generally U-shaped in configuration as shown in FIG. 1, comprises a first section 17 positioned in spaced relationship over the tips of the fan blades as can best be seen in FIG. 2. The condenser also includes a second section 18 which extends from the first section toward the axis of the fan, and is positioned rearwardly of the fan with respect to the air flow therethrough.

Figure 3:
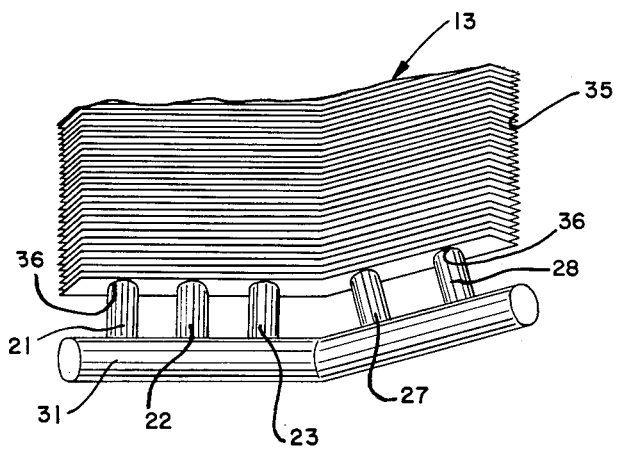
FIG. 3 is a perspective view of one end of the air conditioning system condenser of the present invention.
Figure 4:
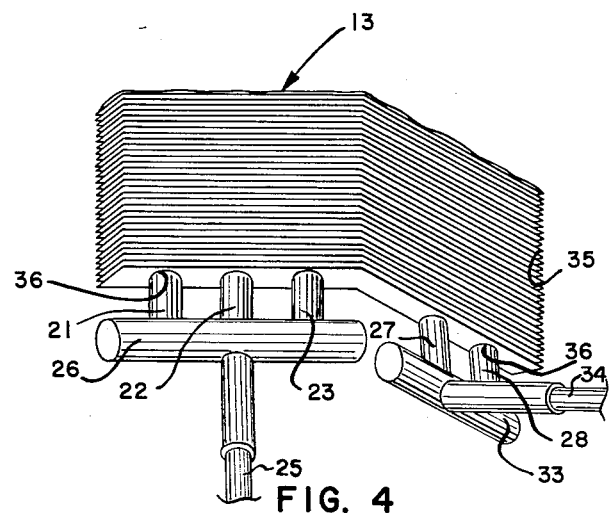
FIG. 4 is a perspective view of the other end of the air conditioning system condenser of the present invention.

The first section 17 of the condenser includes a plurality of conduits, designated by the numerals 21, 22 and 23, which extend from one end of the first section of the condenser to the other end thereof. These conduits receive refrigerant from an engine driven compressor 24, through conduit 25 and header 26. The second section of the condenser also includes a plurality of conduits, designated by the numerals 27 and 28, which extend from one end of this section to the other end thereof. These conduits receive refrigerant from the conduits 21, 22 and 23 by means of a cross-header 31, which can best be seen by reference to FIG. 3. A refrigerant receiver 32 receives refrigerant from the conduits 27 and 28 by means of a header 33 and a conduit 34. Both the first and the second sections of the condenser have a plurality of spaced heat fins 35 extending therefrom. The fins are positioned in heat transferring relationship to the conduits and this may be conveniently accomplished by providing apertures 36 in the fins and by placing the fins over the conduits 21, 22, 23, 27 and 28 so that the conduits extend through the apertures in the fins. The edges of the fins extending from the first section 17 define a pair of spaced planes which are substantially parallel to the axis of the fan 12.

In the operation of the invention, refrigerant is received from an evaporator (not shown) by the engine driven compressor 24. The compressor delivers the refrigerant under pressure to the header 26 of the condenser 13 through the conduit 25. The refrigerant then flows through conduits 21, 22 and 23 in the first section of the condenser, to the cross-header 31 positioned on the opposite side of the condenser. From the cross-header 31 the refrigerant flows through conduits 27 and 28 positioned in the second section of the condenser to the header 33. The refrigerant is then discharged from the header 33 into the receiver 32 by means of the conduit 34. From the receiver the refrigerant flows to the evaporator (not shown) where it is employed for cooling the passenger compartment of the automotive vehicle.

It can thus be appreciated that refrigerant flows from one side of the condenser to the other side, and then returns in a counterflow relationship back to the original side. During this time, the engine driven fan 12 pulls air through the radiator 11 in a direction generally parallel to the axis of the fan. The air is then discharged in a generally combined radial and axial direction through the first and second sections of the condenser as can best be seen by reference to FIG. 2. A shroud 37, as shown in FIG. 2, may be provided between the condenser and the engine to aid this flow pattern.

It can be readily appreciated that the fan delivers approximately all of the air which it receives in a combined radial and axial direction through the condenser, particularly when the shroud shown in FIG. 2 is employed. Thus, substantially all of the air which is moved by the fan through the radiator is brought into heat exchange relationship with the spaced fins of the condenser. This provides an effective air conditioning system for an automotive vehicle, particularly at idle when the engine driven fan must be relied upon the move air past the condenser. In addition, air flow through the radiator is unobstructed, and this provides a more efficient engine cooling system than that provided with conventional air conditioning systems where the condenser is mounted in front of the radiator.

It will be understood that the invention is not to be limited to the exact construction shown and described, and that various changes and modifications may be made without departing from the spirit and scope of the invention, as defined in the appended claims.

What is claimed is:

1. In an automotive vehicle including an engine, an engine driven fan for cooling said engine, an air conditioning system condenser mounted about the periphery of the fan, said air conditioning system condenser comprising a first section having surfaces substantially parallel to the axis of the fan and lying over the tips of the fan blades, and a second section extending from said first section and lying behind said fan with respect to the air flow therethrough and extending toward the axis of said fan.

2. In an automotive vehicle including an engine, an engine driven fan for cooling said engine, an air conditioning system condenser mounted about the periphery of the fan, said air conditioning system condenser comprising a first section having surfaces substantially parallel to the axis of the fan and lying over the tips of the fan blades, and a second section extending from said first section and lying behind said fan with respect to the air flow therethrough and extending toward the axis of said fan, said first and said second sections of said air conditioning system condenser including a plurality of heat radiating fins extending therefrom.

3. In an automotive vehicle including an engine, an engine driven fan for cooling said engine, an air conditioning system condenser mounted about the periphery of the fan, an engine driven refrigerant compressor, a refrigerant receiver, said air conditioning system condenser comprising a first section lying over the tips of the fan blades, a plurality of conduits extending through said first section and connected to receive refrigerant from said engine driven compressor, said air conditioning system condenser also comprising a second section extending from said first section toward the axis of said fan and lying behind the fan with respect to the air flow therethrough, a plurality of conduits extending through said second section connected to receive refrigerant from the conduits extending through said first section and connected to discharge refrigerant to said receiver.

4. In an automotive vehicle including an engine, an engine driven fan for cooling said engine, an air conditioning system condenser mounted about the periphery of the fan, an engine driven refrigerant compressor, a refrigerant receiver, said air conditioning system condenser comprising a first section lying over the tips of the fan blades, a plurality of conduits extending through said first section and connected to receive refrigerant from said engine driven compressor, said air conditioning system condenser also comprising a second section extending from said first section toward the axis of said fan and lying behind the fan with respect to the air flow therethrough, a plurality of conduits extending through said second section connected to receive refrigerant from the conduits extending through said first section and connected to discharge refrigerant to said receiver, said first section of said air conditioning system condenser including a plurality of heat radiating fins extending therefrom to form surfaces substantially parallel to the axis of the fan, said second of said condensers also including a plurality of heat radiating fins.

References Cited in the file of this patent

UNITED STATES PATENTS

| | | |
|---|---|---|
| 1,698,350 | Stitt | Jan. 8, 1929 |
| 1,828,538 | Kucher | Oct. 20, 1931 |
| 2,181,851 | Schlumbohm | Nov. 28, 1939 |
| 2,480,510 | Roper | Aug. 30, 1949 |
| 2,526,243 | Lange | Oct. 17, 1950 |
| 2,774,222 | Jacobs et al. | Dec. 18, 1956 |
| 2,862,652 | Hoiby | Dec. 2, 1958 |